(12) United States Patent
Curtis et al.

(10) Patent No.: US 6,959,779 B2
(45) Date of Patent: Nov. 1, 2005

(54) BELT FORCE SENSOR

(75) Inventors: Brian Michael Curtis, Orion Township, MI (US); Jeffrey A. Clark, Sterling Heights, MI (US); Maria T. Kremer, Armada, MI (US); Harald Lichtinger, Auburn Hills, MI (US); Michael Allan Dingman, Lake Orion, MI (US)

(73) Assignee: Siemens VDO Automotive Corporation, Auburn Hills ( * ) Notice: Subject to any disclaimer, the term of this patent is extended or adjusted under 35 U.S.C. 154(b) by 52 days.

(21) Appl. No.: 10/653,338

(22) Filed: Sep. 2, 2003

(65) Prior Publication Data

US 2004/0049461 A1 Mar. 11, 2004

Related U.S. Application Data

(62) Division of application No. 09/767,973, filed on Jan. 23, 2001, now Pat. No. 6,623,032.

(60) Provisional application No. 60/177,888, filed on Jan. 24, 2000, provisional application No. 60/177,887, filed on Jan. 24, 2000.

(51) Int. Cl.[7] .......................................... B60R 22/00
(52) U.S. Cl. ................................ 180/268; 280/735
(58) Field of Search ........................... 280/735, 801.1, 280/805; 180/268; 73/862.474, 862.471, 73/862.393, 862.451; 340/457.1, 665, 667, 340/438

(56) References Cited

U.S. PATENT DOCUMENTS

| | | | | |
|---|---|---|---|---|
| 3,618,378 A | * | 11/1971 | Shull et al. ............ 73/862.474 |
| 3,686,662 A | * | 8/1972 | Blixt et al. ................... 345/20 |
| 3,817,093 A | * | 6/1974 | Williams ................ 73/862.474 |
| 4,457,251 A | * | 7/1984 | Weman et al. ............... 116/212 |
| 4,473,242 A | * | 9/1984 | Weman ..................... 280/801.1 |
| 4,805,467 A | * | 2/1989 | Bartholomew ......... 73/862.541 |
| 4,885,566 A | * | 12/1989 | Aoki et al. ............... 340/457.1 |
| 5,431,447 A | | 7/1995 | Bauer |
| 5,454,591 A | | 10/1995 | Mazur et al. |
| 5,566,978 A | | 10/1996 | Fleming et al. |
| 5,626,359 A | | 5/1997 | Steffens, Jr. et al. |
| 5,664,807 A | | 9/1997 | Bohmler |
| 5,670,853 A | | 9/1997 | Bauer |
| 5,906,393 A | | 5/1999 | Mazur et al. |
| 5,965,827 A | * | 10/1999 | Stanley et al. .......... 73/862.391 |
| 5,996,421 A | * | 12/1999 | Husby .................... 73/862.451 |
| 6,059,066 A | * | 5/2000 | Lary ........................... 180/268 |
| 6,203,059 B1 | * | 3/2001 | Mazur et al. ................ 280/735 |
| 6,205,868 B1 | * | 3/2001 | Miller .................... 73/862.391 |
| 6,211,793 B1 | * | 4/2001 | Smithson ..................... 340/665 |
| 6,259,042 B1 | * | 7/2001 | David ......................... 177/136 |
| 6,264,236 B1 | * | 7/2001 | Aoki ........................... 280/735 |

(Continued)

FOREIGN PATENT DOCUMENTS

EP 1020320 7/2000

(Continued)

*Primary Examiner*—David R. Dunn

(57) ABSTRACT

An occupant restraint assembly and for a motor vehicle operates to sense the tension forces on a seat belt to detect the presence of a human occupant or a child restraint seat. A sensor attached to the seat belt measures tension forces. The sensor is mounted in line with the seat belt. A strain gauge senses tension on the seat belt. An additional embodiment of the sensor includes three prongs attached to a common beam that allow the sensor to be slipped onto the seat belt without modification to the seat belt. A middle prong includes the strain gauge to sense movement relative to outside prongs. The seat belt threads over the outside prongs and under the middle prong such that tension on the seat belt forces the middle prong transversely to tension exerted on the seat belt.

11 Claims, 2 Drawing Sheets

U.S. PATENT DOCUMENTS 6,301,977 B1 * 10/2001 Stojanovski ........... 73/862.393

FOREIGN PATENT DOCUMENTS

| WO | WO 99/12012 | 3/1999 |
| WO | WO 99/27337 | 6/1999 |
| WO | WO 99/29538 | 6/1999 |
| WO | WO 01/02219 | 1/2001 |

* cited by examiner

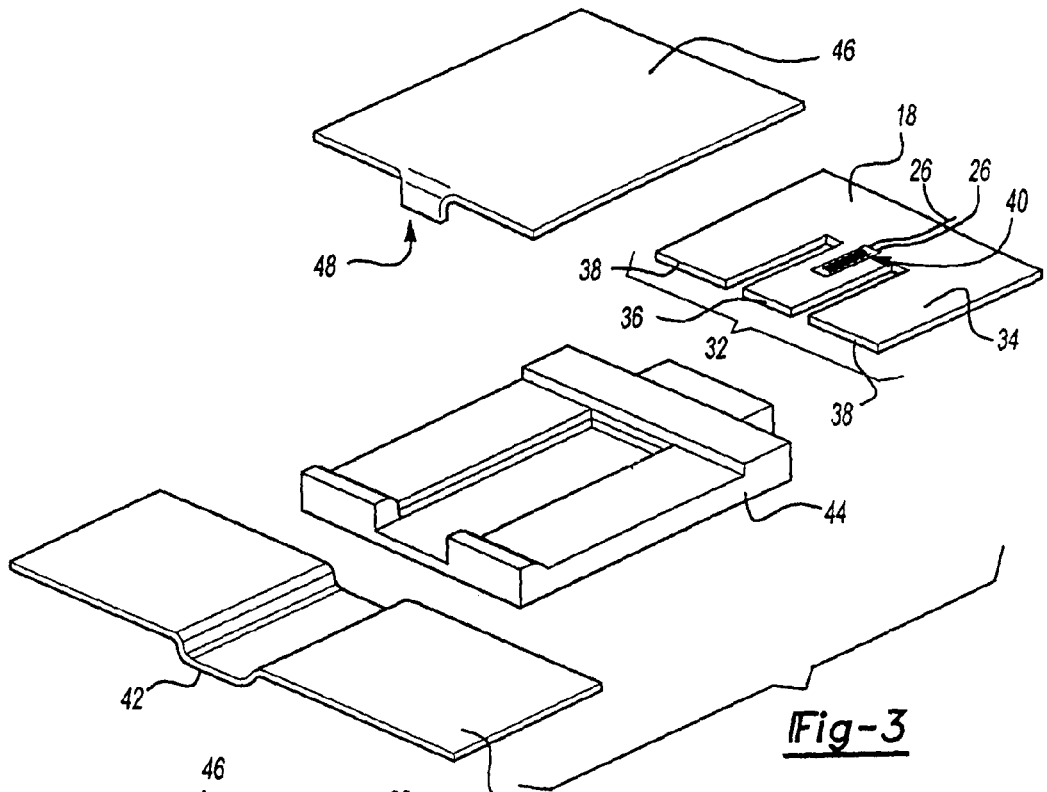
Fig-3
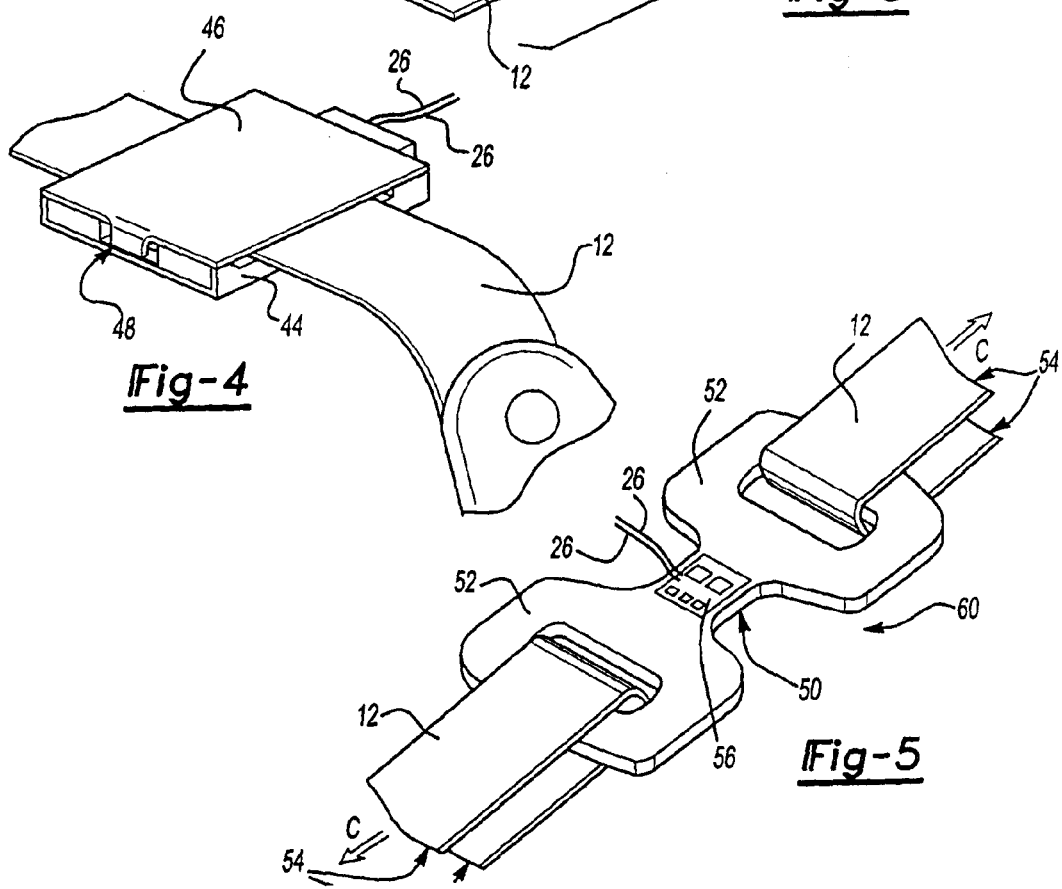
Fig-4
Fig-5

BELT FORCE SENSOR

This application is a divisional of application Ser. No. 09/767,973 filed on Jan. 23, 2001 now U.S. Pat. No. 6,623,032 claims priority to provisional applications Ser. Nos. 60/177,888 and 60/177,887 filed on Jan. 24, 2000.

BACKGROUND OF THE INVENTION

This invention relates to a passenger restraint assembly having a sensor for detecting seat belt tension to indicate the presence of a child restraint seat.

Typically, a motor vehicle will include an air bag system to deploy an air bag cushion to protect passengers in the event of a collision. Air bag cushion deployment must necessarily by quick in order to prevent injury caused by the collision. The speed of deployment of the air bag cushion and the accompanying force of the inflating air bag cushion makes deployment of the air bag cushion to protect small children undesirable. Further, the use of a child restraint seat is not compatible with the intended operation of the air bag system. Although warnings of and prohibitions against the seating of children or the use of child restraint seats where an air bag may deploy are now standard in vehicles equipped with an air bag system, such warning may be ignored, causing undesirable results.

Passive warnings and notices may be supplemented with an active system that senses the type of occupant utilizing the seat and disables air bag deployment based on predetermined criteria. One such system known in the art is a weight based occupant detection system. A weight-based system includes sensors placed in the seat that allow a determination of the weight of the occupant in that seat. Such systems are set to disable the air bag upon a determination that an occupant is below a certain predetermined weight. Such systems work well, however, such a system can be fooled by the placement of child restraint seat over the weight sensors. Typically, the child restraint seat is secured to a seat of a motor vehicle by threading the seat belt around or through the child restraint seat. The seat belt of the motor vehicle does not actually secure the child as is normal when used to secure and adult. Instead the seat belt is used to secure the seat, and then the seat secures the child. Because the seat belt is securing the child restraint seat, it will be pulled tighter than when normally used to secure a human occupant. Pulling of the seat belt tightly around the child restraint seat will provide a large force on the seat, and thereby the weight sensors. Such a force can fool the weight sensor system into believing that a large adult is seated in the passenger seat rather than the child restraint seat and therefore not disable deployment of the air bag cushion.

For these reasons it is desirable and necessary to develop a method and device that can detect and differentiate between the presence of an adult occupant and a child restraint seat such that deployment of the air bag cushion can be disabled when the seat is occupied by a child restraint seat.

SUMMARY OF THE INVENTION

The invention is an assembly and method for sensing the tension forces on a seat belt such that a determination can be made as to the presence of a human occupant or a child restraint seat.

The assembly includes a seat belt attached to an interior support of the motor vehicle. Attached to the seat belt is a sensor that measures the tension forces exerted on the seat belt. Forces above a predetermined magnitude not tolerable by the human occupant indicates the presence of a child restraint seat and thereby provides the information needed to signal disable deployment of the air bag cushion. The sensor of a first embodiment is mounted in line with the seat belt by looping ends of the seat belt through the sensor. A center section of the sensor connects a strain gauge to detect tensile forces exerted on the seat belt. The strain gauge is electrically connected to a controller mounted within the motor vehicle for use in determining if deactivation of the air bag is necessary.

Another embodiment of the invention includes three prongs attached to a common beam. A middle prong includes the strain gauge that operates to sense movement relative to at least two outside prongs. The seat belt is threaded over the outside prongs and under the middle prong. This configuration provides for the installation of the sensor without modification to the seat belt. Tension on the seat belt operates to force the middle prong to move substantially perpendicular to the tension of the belt. The strain gauge mounted on the middle prong senses the amount of movement and signals the controller. The amount of movement of the middle prong is proportional to the tension force placed on the belt, which is used to determine the presence of an adult occupant or a child restraint seat.

The invention also includes a method of differentiating between the presence of a human occupant and a child restraint seat in a motor vehicle. The method includes the steps of sensing tension exerted on a seat belt, communicating the magnitude of the sensed tension to a controller, comparing the magnitude of tension to a predetermined tension, and determining that a child restraint seat is present if the sensed tension is greater than the predetermined tension.

The method and assembly of the subject invention provides the necessary information to detect and differentiate between the presence of an adult occupant and a child restraint seat such that deployment of a vehicle air bag can be prevented when a child restraint seat occupies the seat

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is an exploded view of the first embodiment of the force sensor;

FIG. 4 is a view of the first embodiment enclosed in the housing; and

FIG. 5 is a perspective view of a second embodiment of the force sensor with the seat belt attached.

DETAILED DESCRIPTION OF THE PREFERRED EMBODIMENT

Figure 1:
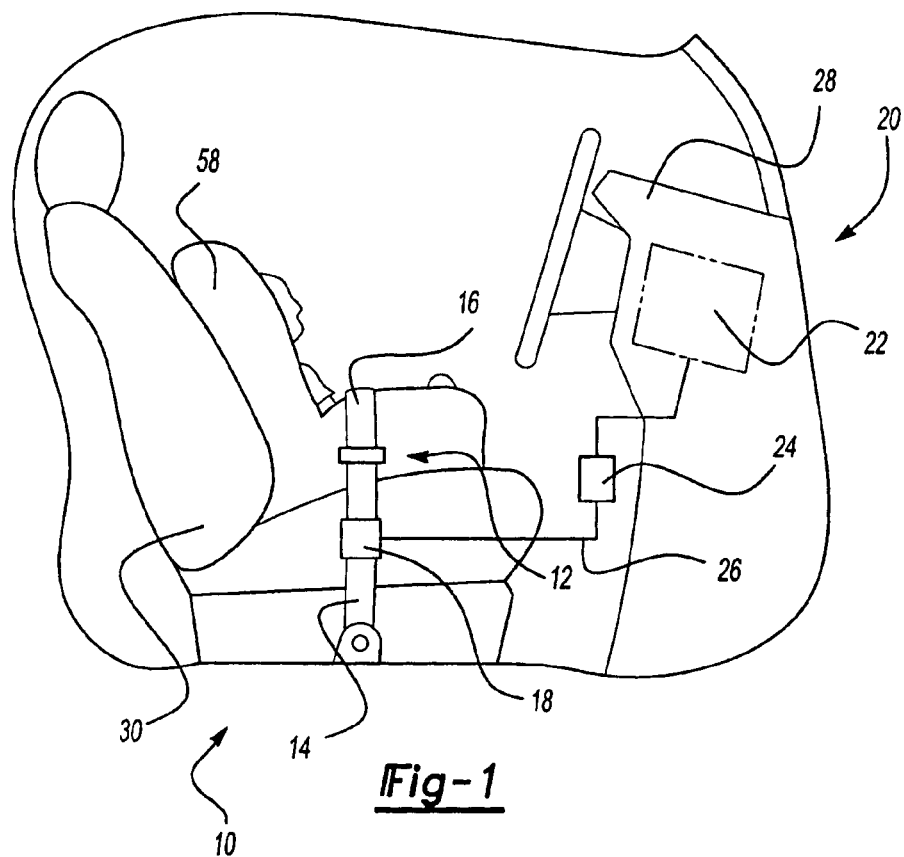
FIG. 1 is perspective view of a seat and the occupant restraint assembly positioned within a motor vehicle.

Referring to the Figures, wherein like numerals indicate like or corresponding parts throughout the several views, the subject invention is an occupant restraint assembly generally shown at 10 in FIG. 1. The assembly 10 includes a seat belt 12 having two sections 14, 16 and a sensor 18. The assembly 10 is disposed within the interior of a motor vehicle 20 having an air bag system 22. A controller 24 is disposed within the motor vehicle 20 and communicates with the sensor 18 by electrical leads 26. The controller 24 also is in communication with the air bag system 22. Typically the air bag system 22 is disposed within a dashboard 28 and positioned to provide protection to a passenger seated in a passenger seat 30. It will be appreciated to those knowledgeable in the art that the subject invention may be placed anywhere and integrated into any seat belt restraint system positioned anywhere within the motor vehicle 20 and coupled with the air bag system 22. The sensor 18, is preferably located on the static or non retracting section of the seat belt 12.

Figure 2:
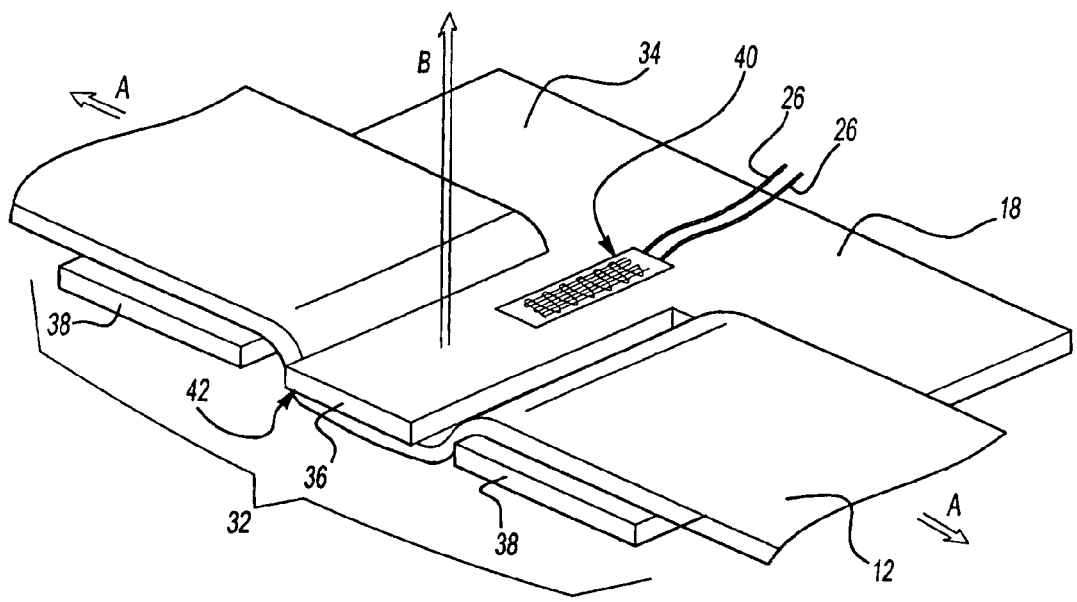
FIG. 2 is a perspective view of the first embodiment of the force sensor.

Referring to FIG. 2, the sensor 18 includes prongs 32 that extend from a common beam 34. The prongs 32 include a middle prong 36 disposed between two outside prongs 38. A strain gauge 40 is disposed on the middle prong 36 for sensing movement of the middle prong 36. The strain gauge 40 may be of any type known by a worker knowledgeable in the art. The strain gauge 40 is electrically attached to the controller 24 of the motor vehicle 20 by way of the leads 26.

The sensor 18 is attached by threading the seat belt 12 over the outside prongs and under the middle prong 36 creating a loop 42 in the seat belt 12. Tension on the seat belt 12, in the direction indicated by arrows A, force the loop 42 to straighten, thereby exerting a force on the middle prong 36 in a direction transverse to the tension on the seat belt as indicated by arrow B. The movement of the middle prong 36 caused by the straightening of the seat belt 12 is sensed by the strain gauge 40. Movement of the middle prong 36 is proportional to the tension exerted on the seat belt 12 and therefore provides for a measurement of the forces exerted on the seat belt 12 and that measurement is communicated to the controller 24.

Referring to FIGS. 3 and 4, a housing 44 and cover 46 encloses the sensor 18 to protect against errant contact. The housing 44 and cover 46 also conceals the sensor 18 and accompanying leads 26 to provide a more pleasing appearance. The housing 44 and cover 46 are preferably fabricated from plastic and are assembled by a simple snap fit configuration 48. As appreciated, the housing 44 and cover 46 arrangement may be of any type known in the art.

An additional embodiment discloses an inline sensor 60 is shown in FIG. 5. The inline sensor 60 of the additional embodiment includes a tensile section 50 disposed between belt ring sections 52. The inline sensor 60 is attached in line with the seat belt 12 by splicing the sensor 60 into the seat belt 12. Splicing is accomplished by looping ends 54 of the seat belt 12 through the belt ring sections 52 and securing the seat belt 12 back into itself. A strain gauge 56 is disposed on the tensile section 50 and is electrically connected to the controller by leads 26. The strain gauge 56 measures tension on the seat belt 12, (shown by arrows C). Measurement of tension exerted on the seat belt 12 is directly measured because the inline sensor 60, being in line with the seat belt 12 encounters the tension in the same direction and magnitude as the seat belt 12.

The measured tension is communicated to the controller 24 and compared to a predetermined tension. The predetermined tension is of a magnitude greater than that normally exerted on a human occupant that would not be tolerable to the human occupant, but would by indicative of the magnitude of force exerted on the seat belt 12 to hold a child restraint seat 58 (shown in FIG. 1) in place.

The subject invention also includes a method of differentiating between a human occupant and the child restraint seat 58 such that the air bag system 22 can be disabled if the child restraint seat 58 is detected. The method includes the sensing of the tension exerted on the seat belt 12 by providing a sensor 18, 60, on the seat belt 12 to communicate the magnitude of tension on the seat belt 12 to the controller 24. As described above, tension is sensed by the use of strain gauge 40, 56 disposed on the sensor 18, 60. The strain gauge 40, 56 senses the amount of strain placed on the sensor 18, 60 by the seat belt 12. The sensed tension is compared to the predetermined tension. As described above, the predetermined tension is a tension determined to be intolerable to a human occupant and indicative of the magnitude of tension commonly used to secure the child restraint seat 58 within the motor vehicle 20. If the magnitude of tension on the seat belt 12 is below the predetermined magnitude, the air bag system 22 will remain enabled. However, if the measured magnitude of tension is above the predetermined magnitude, the air bag system 22 will be disabled due to the indication of the presence of the child restraint seat 58.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of differentiating between the presence of a human occupant and a child restraint seat in a motor vehicle, said method comprising the steps of;

sensing tension exerted on a seat belt with a sensor fixed along the seat belt; wherein the sensor includes a tensile section disposed between two belt loop sections, the tensile section including a strain gauge for sensing force on the seat belt;

communicating the magnitude of the sensed tension to a controller;

comparing the magnitude of tension to a predetermined tension; and determining that a child restraint seat is present if the sensed tension is greater than the predetermined tension.

2. The method of claim 1, wherein the motor vehicle includes an air bag system, and further includes the step of disabling deployment of the air bag system upon determining the presense of the child restraint seat.

3. The method of claim 1, wherein the predetermined tension is further defined as the tension that is normally not tolerable for human occupants and that which is normally exerted to secure a child restraint seat in place.

4. A method of differentiating between the presence of a human occupant and a child restraint seat in a motor vehicle, said method comprising the steps of:

sensing tension exerted on a seat belt with a sensor disposed along said seat belt, wherein said sensor assembly comprises at least three prongs extending from a common beam, said prongs attached to said seat belt without modification of the seat belt;

communicating the magnitude of the sensed tension to a controller;

comparing the magnitude of tension to a predetermined tension; and determining that a child restraint seat is present if the sensed tension is greater than the predetermined tension.

5. The method of claim 4, wherein a strain gauge is disposed on one of said prongs to generate a force signal representive of a force exerted on the seat belt.

6. The method as recited in claim 4, including the step of disabling deployment of an air bag system in response to determination that a child restraint seat is present.

7. A method of operating an occupant restraint system comprising the steps of:

a) determining a tension on a seat belt having a first and second intermediate ends disposed, with a sensor including a tensile portion supported between the first and second intermediate ends;

b) comparing an actual tension determined by the sensor with a predetermined tension; and c) determining that a child restraint device is present responsive to said actual tension being greater than said predetermined tension.

8. The method as recited in claim 7 wherein the occupant restraint system includes an air bag and the method includes the step of disabling deployment of the airbag responsive to determining that a child restraint device is present.

9. The method as recited in claim 7, wherein the sensor includes first and second attachment portions for securing the sensor to the first and second intermediate ends of the seat belt.

10. The method as recited in claim 9, wherein the sensor includes a strain gauge supported on the tensile portion between the first and second attachment portions.

11. The method as recited in claim 7, wherein the seat belt includes a first end portion and a second end portion and the first and second intermediate ends are disposed between the first end portion and the second end portion.

* * * * *